United States Patent
Lukschandel et al.

(10) Patent No.: US 6,783,442 B2
(45) Date of Patent: Aug. 31, 2004

(54) NICKEL-DIAMOND-COATED SAW WIRE WITH IMPROVED ANCHORING OF THE DIAMOND PARTICLES

(75) Inventors: Jörg Lukschandel, Kempten (DE); Jürgen Meyer, Kempten (DE)

(73) Assignee: Wacker-Chemie GmbH, Munich (DE)

(*) Notice: Subject to any disclaimer, the term of this patent is extended or adjusted under 35 U.S.C. 154(b) by 3 days.

(21) Appl. No.: 10/275,321

(22) PCT Filed: May 3, 2001

(86) PCT No.: PCT/EP01/04968
§ 371 (c)(1),
(2), (4) Date: Nov. 8, 2002

(87) PCT Pub. No.: WO01/85376
PCT Pub. Date: Nov. 15, 2001

(65) Prior Publication Data
US 2003/0140914 A1 Jul. 31, 2003

(30) Foreign Application Priority Data
May 11, 2000 (DE) .......................... 100 22 994

(51) Int. Cl.⁷ ................................. B28D 1/08
(52) U.S. Cl. .......................... 451/162; 125/12; 125/21; 125/22; 51/295
(58) Field of Search .............................. 125/12, 18, 21, 125/22, 36; 451/162; 156/33.1, 324, 338, 901; 264/236, 347, 331.13; 24/136 B, 136 L; 403/225, 299, 307, 334; 57/906; 204/12, 27, 28

(56) References Cited

U.S. PATENT DOCUMENTS

| | | | | |
|---|---|---|---|---|
| 3,884,212 A | * | 5/1975 | Armstrong et al. | 125/21 |
| 4,097,246 A | * | 6/1978 | Olson | 51/309 |
| 4,187,828 A | | 2/1980 | Schmid | |
| 4,674,474 A | * | 6/1987 | Baril | 125/21 |
| 4,856,490 A | * | 8/1989 | Kawase et al. | 125/21 |
| 4,906,532 A | | 3/1990 | Spencer, Jr. | |
| 4,907,564 A | * | 3/1990 | Sowa et al. | 125/21 |
| 5,218,949 A | * | 6/1993 | Tomlinson et al. | 125/21 |
| 6,131,558 A | * | 10/2000 | Weber | 125/21 |
| 6,463,921 B2 | * | 10/2002 | Shimazaki et al. | 125/21 |
| 6,526,960 B2 | * | 3/2003 | Asada et al. | 125/21 |

FOREIGN PATENT DOCUMENTS

| | | |
|---|---|---|
| DE | 28 05 745 | 8/1978 |
| DE | 198 27 265 | 12/1998 |
| DE | 19839091 | 3/2000 |
| EP | 0916449 | 5/1999 |
| EP | 1025942 | 8/2000 |
| JP | 63022275 | 1/1988 |
| JP | 01064717 | 3/1989 |
| JP | 06 114739 | 4/1994 |
| JP | 0900/1455 | 1/1997 |

OTHER PUBLICATIONS

Patent Abstracts of Japan, vol. 18, No. 396(17–1644) Jul. 25, 1994.
Patent Abstracts of Japan, vol. 012, No. 227 (97–713) Jun. 28, 1988.
Patent Abstracts of Japan, vol. 013, No. 258 ((17–838), Jun. 15, 1989.
English Derwent Abstract AN 2000–17359 [16] Coresp–to DE 19839091 A1.
English Derwent Abstract AN 1978–G0800A [31] Corresp. to DE 2805745A1.
English Derwent Abstract AN 1999–012305 [02] Coresp. to DE 19822265A1.
(Enc) US 091332,722 (Lukschandel et al).
Patent Abstracts of Japan Pub. # 09001455 A (encl.).

* cited by examiner

Primary Examiner—Joseph J. Hail, III
Assistant Examiner—Anthnoy Ojini
(74) Attorney, Agent, or Firm—Collard & Roe, P.C.

(57) ABSTRACT

The invention relates to a saw wire consisting essentially of a steel wire, an intermediate layer and a metallic binding phase into which diamond grains with an average diameter of 10 to 50 micrometers are inserted, characterized in that the metallic binding phase has a hardness of between 600 and 1100 HV 0.1 and consists of an inner layer and an outer layer which are arranged concentrically around the steel wire provided with the intermediate layer. The inner layer has a thickness of approximately between 10 and 25% of the average diamond grain diameter, while the thickness of the outer layer is such that the overall thickness of the metallic binding phase is 45–55% of the average diamond grain diameter and the diamond grains have an average interval of not more than 5 times their average diameter. Other fine particles with an average diameter of 1 to 6 micrometers are located between the diamond grains with an average diameter of 10 to 50 micrometers.

5 Claims, No Drawings

NICKEL-DIAMOND-COATED SAW WIRE WITH IMPROVED ANCHORING OF THE DIAMOND PARTICLES

CROSS REFERENCE TO RELATED APPLICATIONS

Applicant claims priority under 35 U.S.C. §119 of German Application No. 100 22 994.8, filed on May 11, 2000. Applicants also claim priority under 35 U.S.C. §365 of PCT/EP01/04968, filed on May 3, 2001. The international application under PCT article 21(2) was not published in English.

BACKGROUND OF THE INVENTION

1. Field of the Invention

The invention relates to a nickel-diamond coated saw wire with improved anchoring of the diamond particles in the metallic binder phase.

2. The Prior Art

In DE A 19839091 (corresponds to the U.S. application bearing Ser. No. 09/332722), a nickel-diamond coated saw wire, a process for its production and its use are described. A wire of this type can be used to saw hard, brittle material, such as silicon. The saw wire is produced by introducing a wire, after a chemical pretreatment, into a chemical nickel bath which contains diamond particles, preferably of a mean diameter of from 5 to 30 $\mu$m. The diamond particles which are deposited on the surface of the wire are initially fixed by weak chemical and/or physical bonding forces. During the coating process, the adhering diamond particles are firmly enclosed by the growing nickel layer and are thus securely anchored. The thickness of the metallic binder phase is preferably 5–20 $\mu$m. The properties of the metallic binder phase are considerably improved by subsequent thermal hardening. For example, a reduction in the residual tensile stresses in the metallic binder phase is observed, the adhesive strength is increased and the hardness of the layer rises considerably. When sawing silicon, a wire of this type provides very good sawing results, as can be seen from the abovementioned application.

On account of the properties described, the nickel-diamond coated saw wire also appears to be suitable for sawing hard ceramic materials, such as silicon carbide. Although tests have shown that in principle a saw wire of this type can be used to cut hard ceramic materials, the high hardness of the hard ceramic materials means that the sawing rates which can be achieved and also the service life of the coated saw wire are insufficient for industrial use.

SUMMARY OF THE INVENTION

It is an object of the invention to provide a diamond-coated saw wire which has a high resistance to wear when sawing hard materials, such as for example hard ceramic materials.

The object is achieved by a saw wire, comprising a steel wire, an intermediate layer and a metallic binder phase in which diamond grains, with a mean diameter of 10 to 50 $\mu$m are embedded, the intermediate layer being undamaged and free of diamond grains and serving both to prevent hydrogen embrittlement of the wire and to ensure sufficient adhesive strength of the metallic binder phase, characterized in that the metallic binder phase has a hardness of between 600 and 1100 HV 0.1 and comprises an inner layer and an outer layer, which are arranged concentrically around the steel wire which has been provided with the intermediate layer, the inner layer having a thickness of approximately 10 to 25% of the mean diamond grain diameter and the outer layer having a thickness which is such that the total thickness of the metallic binder phase is 45–55% of the mean diamond grain diameter, and the diamond grains having a mean spacing between them of no more than five times their mean diameter and further fine particles with a mean diameter of from 1 to 6 $\mu$m being situated between the diamond grains with a mean diameter of from 10 to 50 $\mu$m.

The diamond grains which are fixed to the saw wire are therefore anchored in the metallic binder phase approximately as far as their equator.

The diamond grains which are fixed to the wire preferably have a mean diameter of from 25 to 45 $\mu$m. Said diamond grains are preferably positioned on the wire in a quantity which is such that their mean spacing amounts to no more than 0.5 to 3 times their mean diameter.

Further fine particles are situated between the diamond grains of mean diameter of from 10 to 50 $\mu$m. These fine particles are preferably hard-material particles. They have a mean diameter of from 1 to 6 $\mu$m, preferably 2 to 4 $\mu$m. These fine particles are preferably only present in the upper of the two layers of the metallic binder phase.

These relatively small hard-material particles are preferably likewise diamond grains. The mean diameter of these fine diamond grains is not taken into account when establishing the layer thickness of the binder phase (which according to the invention is 45–55% of the mean diamond grain diameter). Only the mean diameter of the coarser diamond grains is used to determine the layer thickness of the binder phase.

Including the coating of abrasive grains, the saw wire according to the invention preferably has a diameter of up to at most 0.35 mm.

The steel wire used is preferably stainless spring steel wire made from chromium-nickel steel. By way of example, material types 1.4310, 1.4401, 1.4539, 1.4568 and 1.4571 (as designated by DIN 17224) are suitable.

The steel wire preferably has a diameter of from 0.15 to 0.30 mm.

The intermediate layer preferably consists of a metal, a metal alloy or a combination of two metals or one metal and one metal alloy.

It is preferably a metal, a metal alloy or a combination of two metals or of one metal and one metal alloy which can be coated by electrodeposition with good adhesive strength and, at the same time, acts as a hydrogen barrier.

Examples of suitable metals are copper and nickel and an example of a suitable metal alloy is brass.

The intermediate layer preferably has a thickness of from 1 to 10 $\mu$m.

The metallic binder phase preferably consists of nickel or nickel alloys. It particularly preferably consists of nickel which has been deposited without external current (chemical nickel).

The metallic binder phase preferably has a hardness HV 0.1 of from 800 to 1100, particularly preferably from 1000 to 1100.

The thickness of the intermediate layer around the wire preferably varies by no more than 5%.

The thickness of the metallic binder phase around the wire preferably varies by no more than 5%, particularly preferably by no more than 2.5%.

In a particularly preferred embodiment, the layer thickness of the metallic binder phase is from 12 to 15 $\mu$m and the thickness of the metallic binder phase around the wire varies by at most 0.4 μm.

The saw wire according to the invention can be produced as follows:

As is already known from DE A 19839091, a wire which has been provided with an intermediate layer undergoes a chemical pretreatment which is adapted to the base material. This pretreatment is known in the prior art and usually comprises known degreasing, pickling and activation treatments. There then follows the coating in a so-called chemical nickel-diamond bath (bath for nickel-diamond deposition without external current). Baths of this type are likewise known in the prior art. As is also known from the prior art, it may be useful to initiate the commencement of the metallization by means of a short surge of current. Uniform diamond embedding over the entire circumference of the wire is achieved by means of a suitable movement of wire and electrolyte. In the process according to the invention, it is essential that the coating takes place in two stages, diamond particles with a mean diameter of 10–50 μm being deposited on the wire in the first stage and fine particles with a mean diameter of 1 to 6 μm being deposited on the wire in the second stage.

By means of the process according to the invention, it is possible within one hour to produce more coated wire by a factor of $10^3$ than by means of electrodeposition in continuous throughput installations with a comparable installation size.

The coating is preferably followed by a heat treatment for at least one hour.

In the process according to the invention, the two-stage coating of the wire following the chemical pretreatment preferably takes place as follows: In the first coating stage, the wire is introduced into a chemical nickel bath which contains diamond particles with a mean diameter of from 10–50 μm, preferably 25–45 μm. The coating process is controlled in such a way that, in the ideal situation, a single layer of diamond grains is deposited on the surface of the wire and these grains are fixed by the growing layer of nickel during the process. The first coating stage has finished as soon as the nickel layer has reached a thickness of 10 to 25% of the mean diamond grain diameter.

In the second coating stage, a further chemical nickel layer is deposited, which contains particles which are significantly finer than the first chemical nickel layer.

The thickness of the chemical nickel layer with fine particles embedded therein which is deposited in this second process stage is selected in such a way that the overall layer thickness including the layer which was deposited in the first coating step preferably amounts to 45–55% of the mean diameter of the diamond grains which were used in the first process step. Therefore, given the approximately equiaxial form of the diamond grain, good anchoring up to approximately the equator of the diamond grains is achieved in the metallic binder phase.

In this bath, the fine particles have a mean grain diameter of from 1 to 6 μm, preferably from 2 to 4 μm.

They are preferably hard-material particles, among which in turn diamond particles are preferred.

Therefore, in this second coating stage the coarse diamond grains are anchored using a further chemical nickel dispersion layer.

In principle, it is also possible for the entire metallic binder phase which is required in order to fix the coarse diamond grains on the wire to be formed as a dispersion layer with embedded coarse diamonds and fine hard-material particles. The coating process for producing a wire of this type is in this case carried out as described in DE 19839091, both coarse and fine grains being added to the coating bath simultaneously. Although a production process of this type is simpler to carry out than the process according to the invention, the wire obtained in this way has the serious drawback that it loses its cutting properties prematurely, in particular when sawing hard materials, for the following reason: The coarse diamond grains which are incorporated toward the end of the residence time of the wire in the coating bath are only slightly fixed on account of their weak anchoring in the binder phase. They are quickly torn out during sawing. This immediately leads to the cutting ability of the wire being lost.

As has already been described in DE-A-19839091, after the coating the saw wire is usually subjected to a heat treatment, preferably at 350° C., in order to reduce residual tensile stresses in the layer and to increase the layer hardness and therefore the resistance of the metallic binder phase to wear.

Since, during the anchoring of the coarse diamond particles in a further dispersion layer, there is already a layer which is under residual compressive stresses, it is preferable to carry out a heat treatment exclusively with a view to increasing the adhesive strength of the layer. To do this, a heat treatment temperature of from 150–200° C. is sufficient.

This low heat treatment temperature has the advantage that even suitable unalloyed high-strength wires can be coated using the process according to the invention and can be thermally treated at 150–200° C. without a critical drop in the tensile strength and elasticity.

Electrodeposition processes are unsuitable for production of the wire according to the invention, since they are unable to achieve the hardness according to the invention of the metallic binder phase and the low fluctuation in thickness of the metallic binder phase which is preferably present.

DETAILED DESCRIPTION OF PREFERRED EMBODIMENTS

The following examples serve to explain the invention in further detail.

EXAMPLE 1 (COMPARATIVE EXAMPLE)

Production of a Comparative Wire as Described in Japanese Laid-Open Publication 09-001455:

60 m of a high-alloy steel wire, which is commercially available under the designation 12 R 10 Nicoat from Sandvik, with a diameter of 0.18 mm were positioned on a support which is customary for electroless nickel deposition.

The wire was subjected to the degreasing, pickling and activation treatment which is customary for electroless deposition of nickel. This was followed by coating in a commercially available chemical nickel-diamond bath (available as Niposit 65 from Shipley, Esslingen). Diamond particles with a mean grain diameter of 25 μm (commercially available standard product) are added to the bath. A uniform embedding of diamonds over the entire circumference of the wire in the binder phase consisting of chemical nickel was achieved by moving wire and electrolyte. After a chemical nickel layer thickness of 3 μm had been achieved, the support was removed from the diamond bath and, after a rinsing step, was transferred into a further chemical nickel bath which, however, was free of solids. The exposure time in this bath was selected in such a way that the thickness of the solid-free layer was 8 μm, resulting in an overall layer thickness of 11 μm. This wire is referred to below as saw wire b).

EXAMPLE 2

Production of a Saw Wire According to the Invention

In the coating process according to the invention, the application of the coarse diamond particles to the wire surface took place as described in Example 1. In this case too, the thickness of the chemical nickel layer was 3 μm. The support was then removed from the bath and, after a rinsing step, was transferred into a further chemical nickel-diamond bath. This bath contained diamond particles with a mean diameter of 2 μm. The exposure time in the bath was selected in such a way that the thickness of the dispersion layer was 8 μm, resulting in an overall layer thickness which was once again 11 μm. This wire is referred to below as saw wire c).

Finally, for hardening purposes, both saw wire variants underwent a heat treatment at 350° C. for one hour.

EXAMPLE 3
Determination of the Wear Resistance of a Saw Wire According to the Invention and Two Saw Wires Belonging to the Prior Art To assess the wires, comparative sawing tests were carried out on silicon and silicon carbide specimens on a Well laboratory wire saw (type 6234) using the measurement system described in DE A 19839091.

The way in which this saw functions, with the saw wire being wound forward and backward, leads to the working direction of the wire changing up to ten times a minute. Therefore, several hundred wire passes take place in the sawing gap during prolonged sawing times, so that the service life of the wire becomes clear.

The following saw wires were used:
a) a known saw wire in accordance with DE A 19839091 (example according to the invention given in that document)
b) a saw wire with the diamond particles anchored using a solid-free nickel layer as described, for example, in Japanese laid-open application 09-001455 (wire from Example 1)
c) a saw wire according to the invention with the diamond particles anchored by a nickel-diamond layer in which diamond particles with a grain diameter of 2 μm have been incorporated (wire from Example 2).

The diamond coating density was identical for all the saw wires. The extent to which the coarse diamond particles project was identical for b) and c). In the case of saw wire a), there were locally significantly higher grain projections on account of the in some cases only slightly embedded diamonds.

The results of the sawing tests can be summarized as follows:

When sawing a silicon cuboid (50×22.5 mm), the best results were achieved with saw wire c). The time required to cut the specimen was approximately 10% lower than with wire a) and also around 5% lower than with wire b).

The advantages of saw wire c) are particularly noticeable with cutting silicon carbide:

In these tests, the specimen used was a SiC cylinder with a diameter of 65 mm. The area sawn per unit time was used as a measure of the cutting performance of the wires. The results are given in Table 1:

TABLE 1

| Sawn area | Area of silicon carbide sawn as a function of the sawing duration | | |
|---|---|---|---|
| | Sawing duration in minutes | | |
| (mm²) | Saw wire a) | Saw wire b) | Saw wire c) |
| 500 | 8.0 | 5.5 | 5.0 |
| 1000 | 16.5 | 13.0 | 10.5 |
| 1500 | 27.5 | 21.0 | 17.5 |
| 2000 | 40.5 | 31.5 | 26.5 |
| 2500 | 56.5 | 44.0 | 36.0 |
| 3000 | 76.0 | 59.5 | 48.5 |

The results given in Table 1 show that when using saw wire c) the time required to cut the silicon carbide specimen is approximately 35% lower than with wire a) and also about 20% lower than with wire b).

Furthermore, it can be seen that as the cutting area increases, the saw wire c) loses much less sawing capacity than wires a) and b) and is therefore particularly suitable for cutting hard materials.

What is claimed is:

1. A saw wire with a high resistance to wear when sawing hard materials, comprising
   a steel wire, an intermediate layer and a metallic binder phase of nickel deposited without external current in which diamond grains, with a mean diameter of 10 to 50 mm μm are embedded, the immediate layer being undamaged and free of diamond grains and serving both to prevent hydrogen embrittlement of the wire and to ensure adhesive strength of the metallic binder phase,
   wherein the metallic binder phase has a hardness of between 600 and 1100 HV 0.1 and comprises an inner layer and an outer layer, which are arranged concentrically around the steel wire which has been provided with the intermediate layer,
   the inner layer having a thickness of approximately 10 to 25% of the mean diamond grain diameter and the outer layer having a thickness which is such that the total thickness of the metallic binder phase is 45–55% of the mean diamond grain diameter, and the diamond grains having a mean spacing between them of no more than five times their mean diameter and further fine particles with a mean diameter of from 1 to 6 mm μm being situated only in the outer layer between the diamond grains with a mean diameter of from 10 to 50 mm μm.

2. The saw wire as claimed in claim 1, wherein the diamond grains which are fixed to the wire have a mean diameter of from 25 to 45 mm μm.

3. The saw wire as claimed in claim 1, wherein the fine particles are hard-material particles.

4. The saw wire as claimed in claim 3, wherein the hard-material particles are diamond grains.

5. A process for producing the saw wire as claimed in claim 1,
   wherein a wire which has been provided with an intermediate layer undergoes a chemical pretreatment to a base material, and in that this is followed by coating in a chemical nickel-diamond bath, and said bath for nickel-diamond deposition being without external current, uniform diamond embedding over the entire circumference of the wire being achieved by means of a movement of wire and electrolyte,
   wherein the coating takes place in two stages, diamond particles with a mean diameter of 10–50 mm μm being deposited on the wire in a first stage and fine particles with a mean diameter of 1 to 6 mm μm being deposited on the wire in a second stage.

* * * * *